United States Patent
Carlsson et al.

(10) Patent No.: US 7,158,877 B2
(45) Date of Patent: Jan. 2, 2007

(54) WAYPOINT NAVIGATION

(75) Inventors: Carl-Olof Carlsson, Linköping (SE); Peter Adebjörk, Linköping (SE)

(73) Assignee: SAAB AB, Linkoping (SE)

( * ) Notice: Subject to any disclaimer, the term of this patent is extended or adjusted under 35 U.S.C. 154(b) by 574 days.

(21) Appl. No.: 10/720,756

(22) Filed: Nov. 25, 2003

(65) Prior Publication Data

US 2004/0193334 A1  Sep. 30, 2004

(30) Foreign Application Priority Data

Mar. 27, 2003  (SE) .................................... 0300871

(51) Int. Cl.
  G05D 1/00  (2006.01)
  G06F 17/00  (2006.01)
  G01C 21/20  (2006.01)
(52) U.S. Cl. ............................... 701/206; 701/2; 701/3; 701/23
(58) Field of Classification Search ................ 701/9, 701/26, 2, 206, 3, 8; 446/33, 57, 56; 244/1 R
  See application file for complete search history.

(56) References Cited

U.S. PATENT DOCUMENTS

| 5,526,265 | A |   | 6/1996 | Nakhla | 701/16 |
| 5,842,142 | A | * | 11/1998 | Murray et al. | 701/16 |
| 5,906,336 | A |   | 5/1999 | Eckstein | 244/135 A |
| 6,043,757 | A | * | 3/2000 | Patrick | 340/963 |
| 6,377,875 | B1 | * | 4/2002 | Schwaerzler | 701/2 |
| 6,519,527 | B1 | * | 2/2003 | Shinagawa | 701/209 |
| 6,739,556 | B1 | * | 5/2004 | Langston | 244/189 |
| 6,922,631 | B1 | * | 7/2005 | Dwyer et al. | 701/206 |
| 7,006,904 | B1 | * | 2/2006 | Pippenger | 701/3 |
| 2003/0144769 | A1 | * | 7/2003 | Meier | 701/3 |
| 2003/0206119 | A1 | * | 11/2003 | Riley | 340/963 |

OTHER PUBLICATIONS

Schiller I et al., Mobile Robots VII USA Nov. 18-20, 1992, Abstract, Database Inspec/IEE.

* cited by examiner

*Primary Examiner*—Thomas Black
*Assistant Examiner*—Christine M. Behncke
(74) *Attorney, Agent, or Firm*—Bingham McCutchen LLP

(57) ABSTRACT

The invention relates to remote control of an unmanned aerial vehicle, UAV, (100) from a control station (110) by means of a wireless command link (115). The UAV (100) may be controlled in an autonomous mode wherein it flies according to a primary route (R1, R1') defined by a first set of predefined waypoints (WP1–WP8, IP). The UAV (100) may also be controlled in a manual mode wherein it flies according to an alternative primary route (R1') defined in real-time by control commands received via the wireless command link (115). Flight control parameters are monitored in both modes, and in case a major alarm condition occurs, the UAV (100) is controlled to follow an emergency route (R2') defined by a second set of predefined waypoints (HP1–HP7, TP1–TP9, IP). Particularly, a major alarm condition is activated if an engine failure is detected. Then, the emergency route (R2') involves flying the UAV (100) to an air space above a termination waypoint (TP9) on the ground at which it is estimated that the vehicle's (100) flight may be ended without injuring any personnel or causing uncontrolled material damages.

22 Claims, 3 Drawing Sheets

WAYPOINT NAVIGATION

THE BACKGROUND OF THE INVENTION AND PRIOR ART

The present invention relates generally to remote control of unmanned aerial vehicles. More particularly the invention relates to a method according to the preamble of claim 1, a computer program according to claim 13, a computer readable medium according to claim 14 and an unmanned aerial vehicle according to the preamble of claim 15.

Remotely controlled unmanned aerial vehicles (UAV:s) represent an increasingly important field of aircraft technology, particularly for the military sector. UAV:s may namely be used to perform a large variety of military operations, such as reconnaissance flight and target combating. Therefore, the prior art includes various examples of solutions for controlling a UAV. For instance, the U.S. Pat. No. 6,377,875 describes a method for controlling a UAV wherein upon loss of radio contact between a control station and the UAV, the UAV flies according to a pre-programmed safety route. During any interruption of the radio contact, the UAV will fly on a substitute route, which is calculated in the UAV. Various methods of returning the UAV after a completed mission, or at the event of loss of radio contact, are also described.

However, the problem of preventing a UAV from crashing uncontrollably during a time period when the radio contact is broken remains to be solved. Namely, basically at any time, a critical fault condition may arise in the UAV, which renders all return routes from the vehicle's present location impossible, and instead forces the UAV to perform a relatively speedy landing operation. Naturally, if such a landing takes place without particular measures being taken, there is a substantial risk that serious adverse effects occur on the ground, for example in the form of injuries to personnel or material damages. In fact, no solution is yet known which is capable of handling a critical fault condition in a UAV concerning its flight control parameters without a command link between the UAV and a control station being active.

SUMMARY OF THE INVENTION

It is therefore an object of the present invention to alleviate the problem above and thus provide an improved solution for controlling an unmanned aerial vehicle.

According to one aspect of the invention this object is achieved by the method of controlling an unmanned aerial vehicle as described initially, which is characterized by the set of flight control parameters including at least one engine parameter. The method includes the following steps. A major alarm condition with respect to an engine failure is activated in case at least one of the at least one engine parameter decreases below a threshold value, for instance if the engine stalls. In such case, the emergency route involves flying the vehicle to an air space above a termination waypoint on the ground where it is estimated that the vehicle's flight may be ended without injuring any personnel or causing uncontrolled material damages. Thus, the emergency route is planned such that at any geographical position and altitude thereon a suitable termination waypoint may be reached in the event of an engine failure.

Naturally, an important advantage attained by this strategy is that the risk of serious adverse effects on the ground occurring due to a crashing UAV is thereby reduced significantly.

According to a preferred embodiment of this aspect of the invention, the set of flight control parameters also includes a command link parameter. The method also involves activating a minor alarm condition with respect to a command link failure in case the command link is interrupted during a first, and relatively short, time interval. In such case, a horizontal flight of the vehicle is initiated. Typically, this is an appropriate step to take in order to avoid a crash, for example if the vehicle has entered a steep dive when the command link failure occurs.

According to another preferred embodiment of this aspect of the invention, the method includes the step of activating a major alarm condition with respect to a command link failure in case the command link is interrupted during a second time interval, which exceeds the first time interval. In such case, the emergency route involves flying the vehicle towards a base location on the ground. Thereby, the chances of reestablishing the radio contact with the base station are improved, and the link failure might be resolved.

According to another preferred embodiment of this aspect of the invention, the flying of the vehicle towards the base location involves elevating the vehicle to a predetermined altitude. Namely, this further improves the chances of reestablishing the command link, since generally, the radio conditions are more favorable at a higher altitude.

According to another preferred embodiment of this aspect of the invention, the alarm condition with respect to the minor command link failure is cleared in case the command link returns before expiry of the second time interval. Thereafter, the flight control of the vehicle is returned to the mode of operation in which it was controlled before the interruption in the command link, i.e. autonomous or manual respectively. This allows the control station to order the vehicle to resume its mission, which of course, is desirable. Preferably, however, an operator acknowledgement is required before the control of the vehicle is returned to the original mode.

According to another preferred embodiment of this aspect of the invention, the emergency route involves flying the vehicle to an air space above a termination waypoint on the ground, in case the command link remains interrupted during a third time interval, which exceeds the second time interval. The length of third time interval is selected with respect to the accuracy in the navigation of the vehicle, such that during the third time interval the vehicle may not divert unacceptably far from the intended route. Consequently, high navigation accuracy allows the third time interval to be relatively long, and vice versa.

According to another preferred embodiment of this aspect of the invention, in case of a major alarm condition has been activated with respect to a command link failure, and the command link remains interrupted during a fourth time interval, which exceeds the third time interval, an emergency landing of the vehicle is initiated at the termination waypoint. Provided that the fourth time interval is selected to a suitable value, a safe emergency landing at a predetermined location may thereby be accomplished.

According to another preferred embodiment of this aspect of the invention however, in case the command link returns at any instance in time, the method involves transmitting a link status message from the vehicle to the control station, which indicates a functioning condition for the command link. Preferably, after transmission of the link status message, the method involves the following steps. First, the vehicle is enabled to receive overriding commands from the control station via the command link. Then, in case such overriding commands are received, the flight according to the emergency route is discontinued, and a flight control according to the autonomous or the manual mode is enabled. Thereby, the vehicle may also be controlled to resume its mission if this should be desired.

According to one preferred alternative embodiment of this aspect of the invention, the autonomous flight control mode involves transmission of the control commands to the vehicle in the form of a number of commands constituting an alternative set of waypoints. I.e. a set of geographical coordinates and altitudes is sent from the control station to the vehicle when the vehicle is already in the air. Typically, the data set specifies positions which the vehicle shall pass in a relatively near future. Generally, this procedure is advantageous to apply if the vehicle is located within, or in proximity of a mission area. Thus, it may conveniently be controlled to complete a particular mission.

According to another preferred alternative embodiment of this aspect of the invention, the manual flight control mode involves transmission of the control commands to the vehicle in the form of real-time commands. I.e. an operator on the ground or in another vehicle may control the UAV in response to joystick commands. Generally, this procedure is advantageous to apply if the UAV is located in proximity of a base location, such as a landing strip/runway, where it may be landed manually.

According to yet another preferred embodiment of this aspect of the invention, points from the first set of predefined waypoints are selected from an indexed table by means of a stepwise procedure. However, points from the second set of predefined waypoints are selected by means of jumping from a first line in the indexed table to a second line in the indexed table. The second line is specified on the first line. Such a stepwise procedure is highly advantageous because it enables a very uncomplicated and straightforward implementation.

According to a further aspect of the invention the object is achieved by a computer program directly loadable into the internal memory of a computer, comprising software for performing the above proposed method when said program is run on a computer.

According to another aspect of the invention the object is achieved by a computer readable medium, having a program recorded thereon, where the program is to make a computer perform the above-proposed method.

According to another aspect of the invention, this object is achieved by the unmanned aerial vehicle as described initially, which is characterized in that the set of flight control parameters includes at least one engine parameter. The functional monitoring system is adapted to, in case at least one of the at least one engine parameter decreases below a threshold value, set an alarm condition with respect to an engine failure. Moreover, the functional monitoring system is adapted to, in such case, fly (or at least glide fly) the vehicle according to an emergency route to an air space above a termination waypoint on the ground where it is estimated that the vehicle's flight may be ended without injuring any personnel or causing uncontrolled material damages. Consequently, the risk that serious adverse effects are caused on the ground due to a crashing UAV is thereby reduced significantly.

According to a preferred embodiment of this aspect of the invention, the functional monitoring system is also adapted to monitor the wireless command link. In case the command link is interrupted during a first (and relatively short) time interval, the functional monitoring system is adapted to activate a minor alarm condition with respect to a command link failure, and initiate a horizontal flight of the vehicle. Thereby, for instance, a crash due to the vehicle performing a manually controlled steep dive may be avoided.

According to a preferred embodiment of this aspect of the invention, the functional monitoring system is also adapted to, in case the command link is interrupted during a second time interval which exceeds the first time interval, perform the steps of activating a major alarm condition with respect to a command link failure, and flying the vehicle towards a base location on the ground. Thereby, the risk that the vehicle is forced to perform an uncontrolled landing is further reduced.

According to a preferred embodiment of this aspect of the invention, the functional monitoring system is adapted to, in case the command link returns before expiry of the second time interval effect the following; clear the alarm condition with respect to the minor command link failure, and return the flight control of the vehicle to the control sub-system which controlled the vehicle before the interruption in the command link, i.e. either the autonomous or the manual control sub-system. Hence, the vehicle's mission may be resumed.

According to a preferred embodiment of this aspect of the invention, the functional monitoring system is adapted to, in case the command link remains interrupted during a third time interval which exceeds the second time interval, fly the vehicle to an air space above a termination waypoint on the ground where it is estimated that the vehicle's flight may be ended without injuring any personnel or causing uncontrolled material damages.

According to a preferred embodiment of this aspect of the invention, the functional monitoring system is adapted to initiate a landing of the vehicle at the termination waypoint if the command link failure remains at expiry of a fourth time interval after that the command link failure occurred. The fourth time interval at least exceeds the third time interval. Thus, provided that the fourth time interval is selected to a suitable value, a safe landing may be accomplished.

According to a preferred embodiment of this aspect of the invention, the functional monitoring system is adapted to, in case the command link returns at any instance in time, generate a link status message which indicates a functioning condition for the command link.

Preferably, the functional monitoring system is also adapted to, after that the link status message has been transmitted to the control station execute the following; enable the vehicle to receive overriding commands from the control station via the command link, and in case such overriding commands are received, discontinue a flight according to the emergency route, such that the vehicle may be manually controlled via the manual control sub-system.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1:
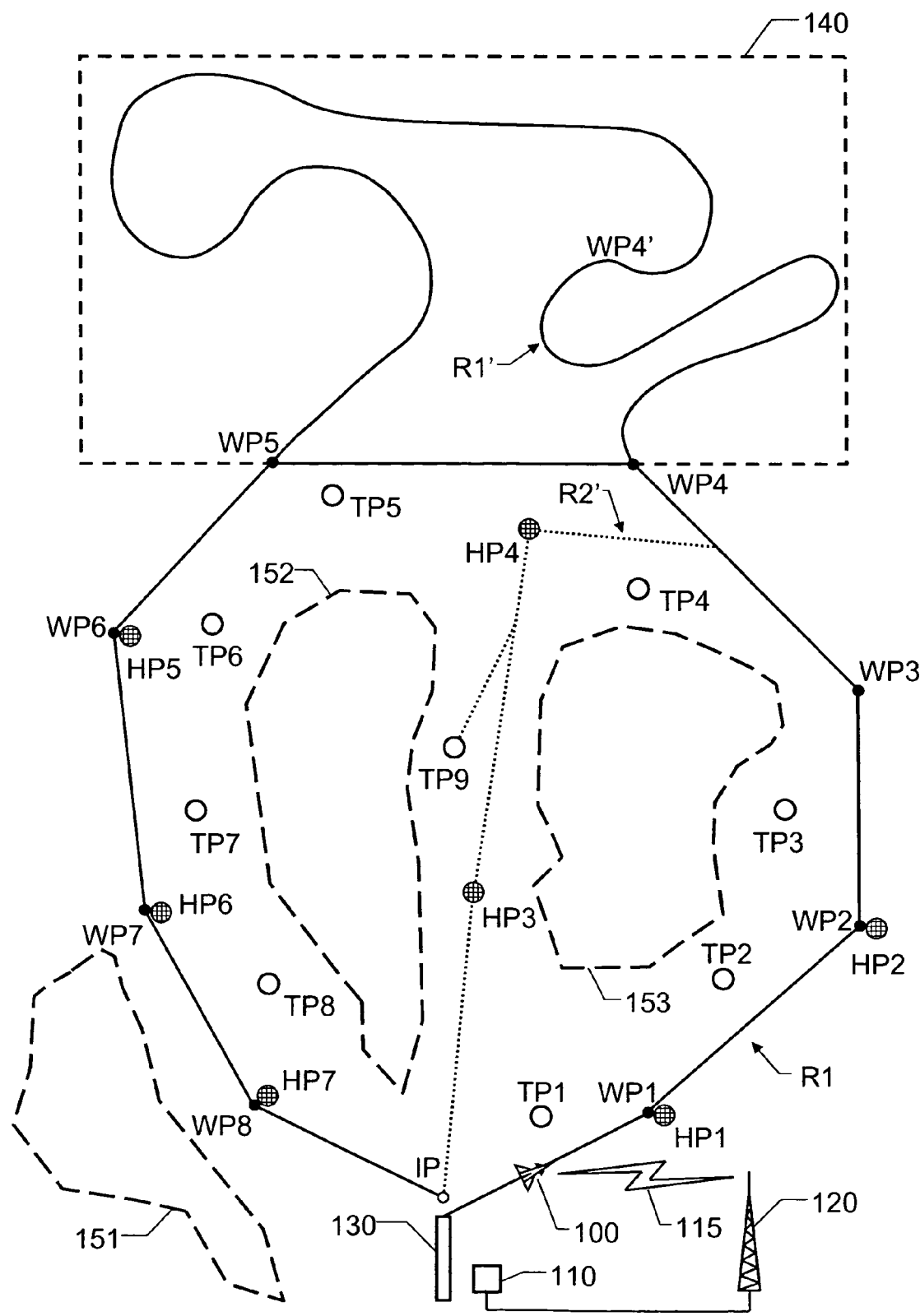
FIG. 1 illustrates the proposed method of controlling a UAV by means of an exemplary primary- and emergency route respectively.

FIG. 1 illustrates the proposed method of controlling an unmanned aerial vehicle 100 by means of an exemplary primary route R1/R1' and an exemplary emergency route R2'. A control station 110 controls the vehicle 100 by means of a wireless command link 115. Preferably, at least in a military application and where the control station 110 is ground based, it should be geographically separated from a base station transceiver 120, which serves the command link 115. Namely thereby, the control station's 110 position cannot be determined on basis of the traffic over the command link 115. However, if the control station 110 is mobile, for instance positioned in another aircraft, it is generally preferable to co-locate it with the base station transceiver 120 for practical reasons.

It is presumed that the vehicle 100 takes off from a runway at a base location 130, which preferably is located relatively proximate to the control station 110 (provided that this type of control station is used). The vehicle 100 may then be controlled to fly along the primary route R1, for example to a mission area 140, where it executes one or more tasks, such as combating a target or performing a reconnaissance mission. The flight of the vehicle 100 can be controlled in either an autonomous mode or a manual mode. In the autonomous mode the vehicle 100 follows a route, which is defined by a set of stored waypoints. The stored waypoints may, in turn, either be pre-programmed (i.e. defined before take off), or be in-flight programmed (i.e. defined after take off and sent to the vehicle 100 via the command link 115). FIG. 1 shows an example of a pre-programmed route R1, which starts at the base location 130 and includes the consecutive waypoints WP1, WP2, WP3, WP4, WP5, WP6, WP7, WP8 and a final approach point IP to the base location 130.

In the manual mode however, the vehicle 100 follows a flight path R1', which is defined in real-time during the flight. This can be accomplished by transmitting flight control commands, via the wireless command link 115, from the control station 110 to the vehicle 100, such that the flight path R1' is defined gradually. For instance, in the manual mode, the real-time control of the vehicle 100 may be aided by camera images recorded by the vehicle 100 and forwarded to the control station 110 over the wireless command link 115. Technically, the manual mode may be entered at any time. However, the manual mode is most commonly used when operating the vehicle 100 within the mission area 140 or during landing of the vehicle 100. For illustrating purposes, FIG. 1 shows an exemplary route R1' within the mission area 140, which the vehicle 100 is controlled to follow by means of manual commands representing an alternative set of waypoints denoted WP4'. The vehicle 100 exits the mission area 140 by resuming the autonomous flight control mode at the waypoint WP5. Thereafter, the vehicle continues to follow the route R1.

According to the invention, it is possible to, at any time, control the vehicle 100 in the autonomous mode by means of in-flight programmed waypoints. This is accomplished by transmitting a set of waypoints to the vehicle 100 via the wireless command link 115. The vehicle 100 may then follow the alternative route defined by these waypoints, either directly or when it reaches a particular position, which represents the start of the alternative route. Commonly, such in-flight programming is performed when the vehicle 100 is located within the mission area 140, such that the vehicle 100 for example follows the route R1'.

Naturally, instead of entering the mission area 140 in the manual mode or the above-described in-flight programmed autonomous mode, the vehicle 100 could have continued to fly from the waypoint WP4 directly to the waypoint WP5, then continued to the waypoint WP6, and so on, according to the pre-programmed route R1 in the autonomous mode. In any case, the manually controlled flight path R1' from the waypoint WP4 to the waypoint WP5 via WP4', the in-flight programmed autonomous route R1' from the waypoint WP4 to the waypoint WP5 via WP4', and the automatically controlled direct route R1 from the waypoint WP4 directly to the waypoint WP5 are regarded as parts of the primary route R1/R1'.

Irrespective of in which flight control mode the vehicle 100 operates, an on-board functional monitoring system monitors a set of flight control parameters which are considered to be especially vital. Thus, in case one of these parameters falls out of an acceptable range, a major alarm condition is activated. This in turn, causes the vehicle 100 to, instead of flying along the primary route R1 or R1', fly according to an emergency route (after a short delay). The emergency route is defined by a second set of predefined waypoints which includes one or more of the following: HP1, HP2, HP3, HP4, HP5, HP6, HP7, TP1, TP2, TP3, TP4, TP5, TP6, TP7, TP8, TP9 and IP. Principally, an emergency route R2' is entered in order to minimize the risk of accidents on the ground, wherein personnel may be injured and/or uncontrolled material damages may be caused. Therefore, all emergency routes must be planned such that they do not pass over or near to a restricted area 151–153. Each restricted area 151–153 is defined as a geographical sector which, for some reason, should not be flown over by a UAV. For example, the restricted areas 151–153 may include highly populated districts, otherwise densely built-up regions and/or terrain segments over which it is particularly difficult to fly and navigate.

A first sub-group of waypoints within the second set of pre-defined waypoints (so-called return waypoints) HP1–HP7 are used to define one or more emergency routes. These waypoints thus indicate a return path for the vehicle 100 in case it should suffer from a fault, which may jeopardize the vehicle's 100 maneuverability. However, the severity of the fault is here normally not worse than a crash landing is still deemed to be avoidable (although naturally this cannot be excluded as an ultimate outcome of the fault). A short interruption of the command link 115 constitutes one example of a fault in this category. An exemplary emergency route R2' is illustrated in the FIG. 1 by means of a dotted line from the route R1, via the return waypoints HP4 and HP3, to the approach point IP.

Should however, a more serious flight control problem arise; the vehicle's 100 flight is diverted towards another type of waypoint, a so-called termination waypoint TP1–TP9. These waypoints represent a second sub-group of waypoints within the second set. The emergency route must be planned such that at any geographical position and altitude thereon a suitable termination waypoint TP1–TP9 may be reached in the event of an engine failure. Moreover, all emergency routes are allocated at least one termination waypoint TP1–TP9. Each termination waypoint TP1–TP9 defines a geographical position where it is estimated that the vehicle's 100 flight may be ended without injuring any personnel or causing uncontrolled material damages. Consequently, all the termination waypoints TP1–TP9 are located outside, and at a particular minimum distance from the restricted areas 151–153. Moreover, each termination waypoint TP1–TP9 is selected so that it can be reached from the emergency route, for example R2', when flying from one return waypoint to its subsequent neighbor at a typical altitude and speed. What represents a typical altitude and speed varies considerably depending on the type of vehicle and for which function it is designed. Normally, no termination waypoints are defined in the mission area 140. Hence, if a serious flight control problem occurs when the vehicle 100 is located within the mission area 140, the vehicle 100 is allowed to become uncontrollable and crash arbitrarily. However, if a less critical fault appears, the vehicle 100 will be controlled to fly towards a waypoint (e.g. HP4) located near the boundary of the mission area 140. This will be discussed in further detail below.

The engine thrust constitutes one important example of a flight control parameter with such potentially detrimental effects that the vehicle 100 should be controlled towards one of the termination waypoints TP1–TP9, at least if the vehicle 100 is only equipped with a single engine. Therefore, according to the invention, if an engine parameter (e.g. related to the thrust force) decreases below a threshold value (or even causes the engine to stall), an alarm condition with respect to an engine failure is activated. Temperature level, pressure level and revolutions per minute (rpm) are other engine parameters which may trigger such an alarm condition.

A locked/malfunctioning servo-unit represents yet another example of an error type which may cause flight control problems of similar magnitude. Hence, preferably, the functional monitoring system also monitors relevant servo-unit parameters. In case of an engine failure and after that the vehicle 100 has reached an air space above a termination waypoint TP1–TP9, the vehicle 100 will circle in the air while gradually lowering its altitude until it completes an emergency landing at the termination waypoint TP1–TP9. If, during execution of these circling maneuvers, the problem which forced the vehicle 100 to fly (or glide fly) to the termination waypoint TP1–TP9 is resolved, the vehicle 100 transmits a status message to the control station 110 indicating this fact. Thereby, via an acknowledgement message and overriding commands from the control station 110, the termination process may be cancelled.

If the vehicle 100 is controlled to a termination waypoint TP1–TP9 because the command link has been broken during an extended time, the vehicle 100 will first circle in the air above the termination waypoint TP1–TP9 until a particular timer has elapsed. Then, the vehicle 100 initiates an emergency landing at the termination waypoint TP1–TP9. This will be described in further detail below with reference to the FIGS. 2, 4 and 5. In addition to the return waypoints HP1–HP7 and the termination waypoints TP1–TP9, the emergency route includes the approach point IP, over which the vehicle will circle in the air while awaiting a landing order from the control station before initiating a landing at the base location 130. Preferably, the approach point IP is also included in the primary route R1 because also on this route, a user prompted landing is generally desirable. Table 1 below describes the primary route R1, alternative emergency routes R2, R2' (indicated with bold arrows) and their respective waypoints, return waypoints and termination waypoints.

TABLE 1

Alarm Handling

| Route | Index | Waypoint | Return Waypoint | Termination Waypoint |
|---|---|---|---|---|
| R1 | 1 | WP1 | IP (index 9) | TP1 (index 16) |
| R1 | 2 | WP2 | HP1 (index 14) | TP2 (index 17) |
| R1 | 3 | WP3 | HP2 (index 13) | TP3 (index 18) |
| R1 | 4 | WP4 | HP4 (index 10) | TP4 (index 19) |
| R1 | 5 | WP5 | HP5 (index 6) | TP5 (index 20) |
| R1 | 6 | WP6 | HP6 (index 7) | TP6 (index 21) |
| R1 | 7 | WP7 | HP7 (index 8) | TP7 (index 22) |
| R1 | 8 | WP8 | IP (index 9) | TP8 (index 23) |
| R1 | 9 | IP | IP (index 9) | TP1 (index 16) |
| R2' | 10 | HP4 | HP3 (index 11) | TP4 (index 19) |
| R2' | 11 | HP3 | IP (index 12) | TP9 (index 24) |
| R2' | 12 | IP | IP (index 12) | TP1 (index 16) |
| R2 | 13 | HP2 | HP1 (index 14) | TP3 (index 18) |
| R2 | 14 | HP1 | IP (index 15) | TP2 (index 17) |
| R2 | 15 | IP | IP (index 15) | TP1 (index 16) |
| R2 | 16 | TP1 | TP1 (index 16) | TP1 (index 16) |
| R2 | 17 | TP2 | TP2 (index 17) | TP2 (index 17) |
| R2 | 18 | TP3 | TP3 (index 18) | TP3 (index 18) |
| R2 | 19 | TP4 | TP4 (index 19) | TP4 (index 19) |
| R2 | 20 | TP5 | TP5 (index 20) | TP5 (index 20) |
| R2 | 21 | TP6 | TP6 (index 21) | TP6 (index 21) |
| R2 | 22 | TP7 | TP7 (index 22) | TP7 (index 22) |
| R2 | 23 | TP8 | TP8 (index 23) | TP8 (index 23) |
| R2 | 24 | TP9 | TP9 (index 24) | TP9 (index 24) |

The table 1 represents a high-level program sequence, which for each waypoint towards which the vehicle 100 is directed to fly specifies a return waypoint and a termination waypoint being applicable in case a major alarm condition occurs. For example, the first line, wherein in the second column has index=1, indicates conditions being applicable when the vehicle 100 flies towards a first waypoint WP1. Correspondingly, the second line, wherein in the second column has index=2, indicates conditions being applicable when the vehicle 100 flies towards a second waypoint WP2, and so on.

The program is then executed stepwise—one index after the other—such that after having passed a particular waypoint (say WP1) as specified in the third column, the procedure steps down one line (i.e. increments the index by one) and starts flying towards the subsequent waypoint (WP2). In this context, a waypoint is considered as having been passed if the vehicle 100 first approaches the waypoint, such that it becomes located within a particular distance from the waypoint, and then starts to move away from the waypoint. Naturally, in practice, each of the waypoints in the table 1 above is also associated with a set of geographical and physical data, for example indicating a latitude, a longitude, an altitude, a velocity and a maximal roll angle for the vehicle 100.

If a major alarm condition arises before the vehicle 100 has reached the waypoint towards which it is currently flying, the procedure checks the relevant column (4 or 5 in the table 1) of the active waypoint index for an applicable subsequent index, and jumps to this index. Then, the procedure continues from this waypoint index, and so on. The procedure stops whenever an approach point IP or a termination waypoint TP has been reached.

Hence, the table 1 specifies the primary route R1/R1' when the vehicle 100 flies in the autonomous mode. The table 1 also specifies different emergency routes R2 to be applied in case of an alarm condition. However, the table 1 is applicable in the manual mode too. Namely in this case, the vehicle 100 repeatedly searches for a closest waypoint WP1–WP8 or IP, such that in case of an alarm condition, it may select an appropriate return waypoint HP1–HP7 or a termination waypoint TP1–TP9. Moreover, a mode switch from the manual mode to the autonomous mode may be performed at any time. When entering the autonomous mode this way, the vehicle 100 simply starts to fly towards the closest waypoint as indicated by the currently active waypoint index.

Below follows an example which further will elucidate the proposed method. If the command link 115 is interrupted during a sufficiently long interval after that the vehicle 100 has passed the waypoint WP3, however not yet has reached the waypoint WP4, the vehicle 100 diverts from the primary route R1. Instead, the vehicle 100 follows an emergency route R2' towards the return waypoint HP4. Provided that the command link failure remains also after having passed the return waypoint HP4, the vehicle 100 continues towards the waypoint HP3 with a final destination at the approach point IP (see the indices 10, 11 and 12 in the table 1). Here, however, an engine failure occurs before the vehicle 100 has reached the return waypoint HP3. Therefore, the vehicle's 100 route is again altered. This time, the termination waypoint TP9 is its next destination, as opposed to the previously intended return waypoint HP3 (see index 11 in table 1). In this example, we assume that the engine failure cannot be resolved in due time. Hence, the vehicle 100 emergency lands (as safely as possible) at the termination waypoint TP9. Further details pertaining to the conditions for making the decisions to alter the vehicle's 100 path from the primary route R1/R1' to the emergency route R2', and while on the emergency route R2', changing the return waypoint HP3 to the alternative destination TP9 will be described below with reference to the FIGS. 2, 4 and 5.

Figure 2:
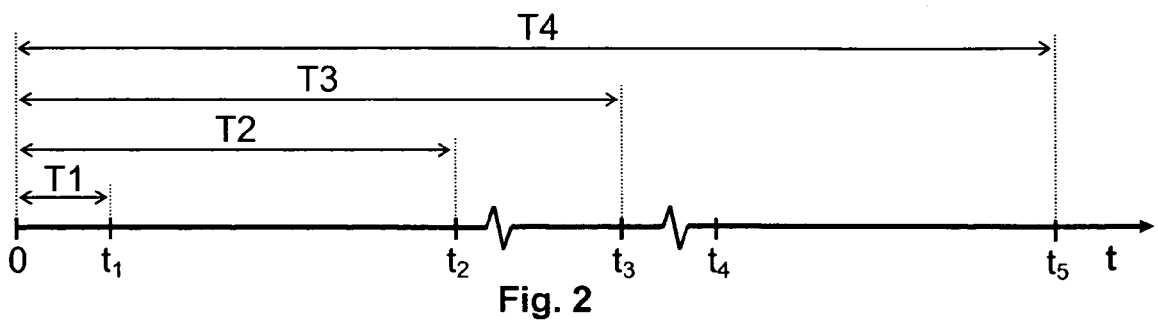
FIG. 2 shows a time line, which illustrates the extension of and relationships between time intervals applicable according to embodiments of the invention.

FIG. 2 shows a time line illustrating the time periods which determine the decisions made when altering the vehicle's 100 routes and destinations according to embodiments of the invention.

As already mentioned, the vehicle monitors a number of flight control parameters, among them a command link parameter which reflects a quality of the command link between the control station and the vehicle. A very simple measure in this regard is to define the quality in two discrete levels representing a connection state and an interruption state respectively. Of course, more precise quality levels may also be defined. Here, however, it is assumed that the command link is interrupted at a point in time t=0. If the command link is interrupted during a first time interval T1 (say 1 second) from this point in time t=0 (i.e. until t=$t_1$), an alarm condition with respect to a minor command link failure is activated. A horizontal flight of the vehicle is initiated in connection with activating this alarm condition.

Normally, a short command link interruption (in the order of 1 second) can be tolerated without any particular precautionary actions being necessary. Should, however, the command link remain interrupted during a second time interval T2 (say 5 seconds), which significantly exceeds the first time interval T1 (i.e. from t=0 to t=$t_2$; where $t_2 >> t_1$), a major alarm condition with respect to a command link failure is activated. In this case, there is namely a substantial risk that the vehicle becomes uncontrollable. Therefore, the vehicle diverts from the primary route and starts following an emergency route, which involves flying the vehicle towards a base location on the ground (such as the runway 130 in FIG. 1). According to a preferred embodiment of the invention, at this point in time, the vehicle also elevates to a predetermined altitude. Both these measures, i.e. turning back and elevating, generally improve the radio conditions and thus increase the chances of reestablishing the command link. Moreover, elevating the vehicle generally reduces the risk of a crash landing.

If the command link returns (i.e. reconnects) before expiry of the second time interval, the minor alarm condition with respect to a command link failure is preferably cleared, and the flight control of the vehicle is returned to the mode in which the vehicle was controlled before the interruption in the command link.

Nevertheless, if not only the second time interval T2, but also a third and much longer time interval T3 (say 5 minutes from t=0) expires without the command link returning, the major alarm condition remains active and the emergency route is altered, such that it involves flying the vehicle to an air space above a termination waypoint. The length of the time interval T3 is generally selected with respect to the accuracy in the navigation of the vehicle, such that during the time interval T3 the vehicle may not divert unacceptably far from the intended route. In this example, it is presumed that the vehicle reaches the air space above the relevant termination waypoint (as determined by preprogrammed information in the vehicle) at a point in time t=$t_4$. The vehicle then starts to circle over this termination waypoint. At expiry of a fourth time interval T4 (say in total 10 minutes after t=0) when t=$t_5$, the vehicle initiates an emergency landing at the termination waypoint.

According to a preferred embodiment of the invention, the vehicle transmits a status message to the control station if the command link should return at any instance in time. The vehicle is then also enabled to receive overriding commands from the control station via the command link. Thereby, the control station is informed of the fact that there is a connection to the vehicle, and it may be decided that the flight according to the emergency route should be discontinued. Instead, the primary route may be resumed, for example in the autonomous preprogrammed flight control mode. Of course, any overriding commands from the control station may equally well involve transmission of the control commands to the vehicle in the form of a number of commands constituting an alternative set of predefined waypoints, i.e. in-flight programmed flight control. Alternatively, a manual flight control may be activated at this point.

Figure 3:
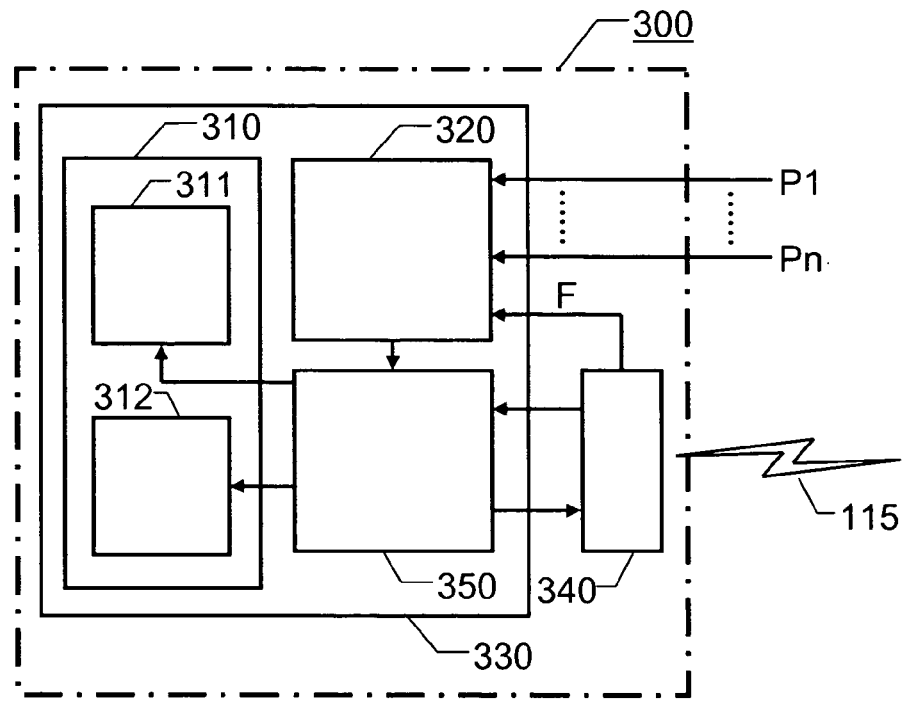
FIG. 3 shows a block diagram over a signal processing system according to an embodiment of the invention.

FIG. 3 shows a block diagram over a signal processing system 300 according to an embodiment of the invention which includes a central processing unit 330 and a wireless interface unit 340. An on-board flight control system 310, a functional monitoring system 320 and an interfacing unit 350 are included in the central processing unit 330.

The on-board flight control system 310, in turn, contains an autonomous control sub-system 311 and a manual control sub-system 312. The autonomous control sub-system 311 is adapted to control the vehicle to fly according to a primary route defined by a first set of predefined waypoints, preferably stored in the sub-system 311. Correspondingly, the manual control sub-system 312 is adapted to control the vehicle to fly according to a primary route, however in accordance with real-time commands received from the control station 110. These commands arrive via the wireless command link 115, the wireless interface unit 340 and the interfacing unit 350 in the central processing unit 330. The wireless interface unit 340 is also adapted to send any status messages generated by the functional monitoring system 320 to the control station.

The functional monitoring system 320 is adapted to monitor a set of flight control parameters P1–Pn. In case any of these parameters P1–Pn falls outside an acceptable range, the functional monitoring system 320 sets a relevant major alarm condition. This, in turn, will result in that the vehicle initiates a flight according to an emergency route defined by a second set of stored waypoints. Additionally, if a less critical fault is encountered, the functional monitoring system 320 may set a minor alarm condition, which will not cause the vehicle to select the emergency route. A short interruption of the wireless command link constitutes one example of such a fault.

According to the invention, one of the flight control parameters, say P1, represents a vital engine parameter. In case this parameter decreases below a threshold value (e.g. implying that the rpm is insufficient), the functional monitoring system 320 sets a major alarm condition with respect to an engine failure. As a consequence thereof, the vehicle will take the emergency route to an air space above a termination waypoint on the ground at which it is estimated that the vehicle's flight may be ended without injuring any personnel or causing uncontrolled material damages.

Additionally, the wireless interface 340 may generate a signal F, which is sent to the functional monitoring system 320. This signal F is produced in order to indicate that the command link has been reestablished.

Figure 4:
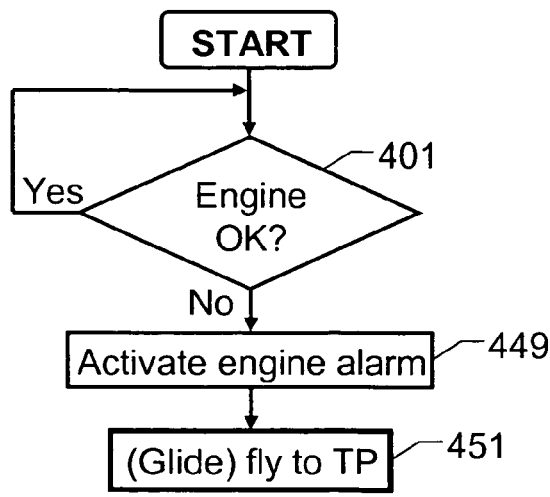
FIG. 4 shows a first flow diagram, which summarizes the general method according to the invention.
Figure 5:
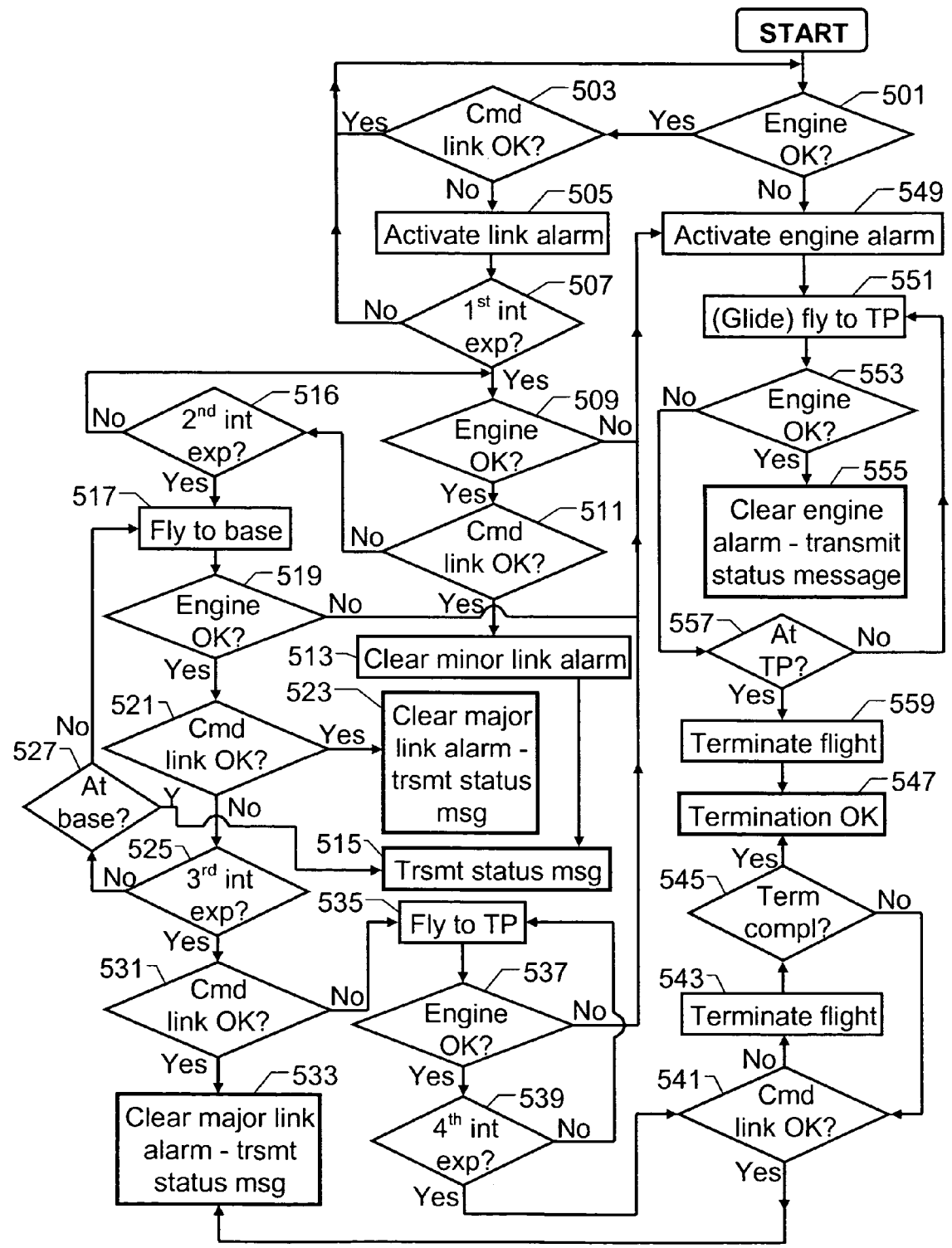
FIG. 5 shows a second flow diagram, which illustrates the method according to preferred embodiments of the invention.

A more detailed description of the operation of the functional monitoring system 320 and its interaction with the other units in the central processing unit 330 will be described below with reference to FIG. 5. First however, the general method of controlling a UAV according to the invention will be described with reference to FIG. 4.

It is presumed that the UAV is controllable from a control station by means of a wireless command link. Moreover, the UAV may be controlled both in an autonomous mode wherein the vehicle flies according to a primary route defined by a first set of stored waypoints, and in a manual mode wherein the vehicle flies according to a primary route defined by flight control commands received via the wireless command link. A set of flight control parameters is monitored in both the autonomous and the manual mode. In case a major alarm condition occurs in any of the modes, the method involves flying the UAV according to an emergency route defined by a second set of predefined waypoints.

A particular procedure is devised to prevent the UAV from crash landing at an undesired location. Here, a first step 401 checks whether the vehicle's engine is in order. This may involve testing if one or more engine parameters, such as thrust force, temperature level, pressure level and rpm, lie within an acceptable range. If this is the case, the procedure loops back and stays in the step 401. However otherwise, a step 449 activates a major alarm condition with respect to an engine failure. Subsequently, a step 451 controls the UAV to fly (or glide fly) to an air space above a termination waypoint, where it is estimated that the UAV's flight may be ended without injuring personnel or causing any intolerable material damages.

Now, a more detailed procedure according to the preferred embodiments of the invention will be described with reference to FIG. 5. Steps 501, 549 and 551 are equivalent to the steps 401, 449 and 451 respectively in FIG. 4. However, according to this embodiment of the invention, if the check in the step 501 finds that the engine is in order, a following step 503 checks whether the command link also has an acceptable quality, and if so, the procedure loops back to the step 501. Otherwise, a step 505 follows.

The step 505 activates a link alarm, which at this stage is regarded as a minor alarm condition. Subsequently, a step 507 checks whether the first time interval has expired (see FIG. 2), and if not, the procedure loops back to the step 501.

If, however, the first interval has expired, a step 509 follows. This step again checks whether the engine is in order, and if so, a step 511 follows. Otherwise, the procedure jumps to a step 549 in which an engine alarm is activated to represent a major alarm condition.

The step 511 checks whether the command link still has an acceptable quality, and if so, a step 513 follows in which the minor link alarm activated in the step 505 is cleared. After that, a step 515 transmits a status message to the control station (see 110 in FIG. 1). According to a preferred embodiment of the invention, an acknowledgement message from the control station in response to the status message is required before the flight control of the UAV may be returned to the control mode in which it was operated before the link alarm was activated. If the test in the step 511 is answered in the negative, the procedure continues to a step 516 which checks whether the second interval (see FIG. 2) has expired. If it is found that this interval is still running, the procedure loops back to the step 509. Otherwise, the link alarm is now regarded as a major alarm condition, and a step 517 follows, which orders the UAV to fly towards the base location (see e.g. 130 in FIG. 1). Then, a step 519 checks whether the engine operates as desired, and if so, a step 521 follows. Otherwise, the procedure jumps to the step 549.

The step 521 checks whether the command link has regained an acceptable quality, and if so, a step 523 follows in which the major link alarm is cleared. Additionally, the step 523 involves transmission of a status message to the control station. The control of the UAV may there after be resumed in the mode in which it was controlled before the link alarm was activated. However, also in this case, it is preferable that an acknowledgement message is received from the control station first.

Nevertheless, if the test in the step 521 produces a negative result, a step 525 follows, which checks whether the third interval (see FIG. 2) has expired. If this is the case, a step 531 follows. Otherwise, the procedure continues to a step 527, which checks whether the UAV has reached the base station, and if so the step 515 follows. If, however, the UAV has not yet reached the base station, the procedure loops back to the step 517 wherein it continues to fly towards the base station. The step 515 here transmits a status message indicating that the UAV has returned to the base station and may be landed. Either a landing maneuver is then automatically initiated (e.g. after reception of an acknowledgement message from the control station), or the UAV is landed manually by means of real-time flight control commands from the control station.

If the test in the step 525 finds that also the third interval has expired, a step 531 follows wherein the command link is checked once more. If the command link here is found to have an acceptable quality, a step 533 follows in which the major link alarm is cleared. The step 533 also involves transmission of a status message to the control station, where after the control of the UAV may be resumed in the mode in which the UAV was controlled before the link alarm was activated. Again, it is preferable that an acknowledgement message is received from the control station first.

If, it in the step 531 is found that the command link still has an unacceptably low quality, a step 535 follows which orders the UAV to fly towards a specified termination waypoint (see e.g. the table 1). Then, a step 537 checks whether the engine is in order, and if so, a step 539 follows. Otherwise, the procedure jumps to the step 549 in which an engine alarm is activated. The step 539 checks whether the fourth interval has expired (see FIG. 2), and if so, a step 541 follows. Otherwise, the procedure loops back to the step 535, such that the UAV continues to fly towards the termination waypoint. If, the UAV has already reached this point (i.e. before the fourth interval expires) the loop described by the steps 535, 537 and 539 implies that the UAV circles over the termination waypoint until the fourth interval expires.

The step 541 checks whether the command link has an acceptable quality, and if so, the step 533 follows wherein the major link alarm is cleared and a status message is transmitted to the control station, where after the control of the UAV may be resumed in the mode in which the UAV was controlled before the link alarm was activated. Again, it is preferable that an acknowledgement message is received from the control station first. If the step 541 finds that the command link still has an unacceptably low quality, the procedure continues to a step 543 in which a termination of the flight is initiated at the termination waypoint (which the UAV now shall have reached). Subsequently, a step 545 checks whether the termination has been completed, i.e. if the UAV's flight is stopped permanently. If so, the procedure ends in a step 547 which indicates that a successful termination has been accomplished. Otherwise, the procedure loops back to the step 541, and whatever measures which remain to complete the termination are performed. For example, this may mean that the circulation maneuvers over the termination point are continued with a gradually lowered altitude.

The step 549, which indicates an engine alarm, may be entered from any of the steps 501, 509, 519 or 537 if it is found that the engine is malfunctioning. In any case, after the step 549 follows a step 551 in which the UAV is ordered to fly, or if the engine has stalled, glide fly towards a specified termination waypoint (see e.g. the table 1). Subsequently, a step 553 checks whether the engine is operating satisfactorily. The engine problem may namely have been resolved since the engine alarm was activated, and if so, the engine alarm is cleared in a step 555 and a corresponding status message is transmitted to the control station, such that the termination procedure may be interrupted by means of a manual intervention. If, however, the step 553 finds that the engine is still out of order, the procedure continues to a step 557, which checks whether the UAV has reached the specified termination waypoint. If this is not the case, the procedure loops back to the step 551. Otherwise, however, a step 559 following the step 557 initiates a termination process at the termination waypoint. After that, the procedure ends in the step 547, which indicates that a successful termination has been accomplished.

Thus, the step 547 represents a definitive end of the procedure. Although the procedure according to the flow chart also ends in each of the steps 515, 523, 533 and 555, these steps instead imply returning the procedure to the start step, preferably after reception of an acknowledgement message from the control station.

All of the process steps, as well as any sub-sequence of steps, described with reference to the FIGS. 4 and 5 above may be controlled by means of a programmed computer apparatus, preferably located in an on-board central processor of an unmanned aerial vehicle's signal processing system. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a ROM (Read Only Memory), for example a CD (Compact Disc) or a semiconductor ROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of controlling an unmanned aerial vehicle from a control station by means of a wireless command link, involving:
   flight control in an autonomous mode wherein the vehicle flies according to a primary route defined by a first set of predefined waypoints,
   flight control in a manual mode wherein the vehicle flies according to a primary route defined by control commands received via the wireless command link, and
   functional monitoring of a set of flight control parameters in both the autonomous mode and the manual mode, wherein if, in any of the modes, at least one of the flight control parameters falls outside an acceptable range a major alarm condition is activated, the method involves flying the vehicle according to an emergency route defined by a second set of predefined waypoints, wherein the set of flight control parameters including at least one engine parameter, the method comprising:
   activating a major alarm condition with respect to an engine failure in case at least one of the at least one engine parameter decreases below a threshold value, and in such case,
   the emergency route involves flying the vehicle to an air space above a termination waypoint on the ground at which it is estimated that the vehicle's flight may be ended without injuring any personnel or causing uncontrolled material damages.

2. The method according to claim 1, wherein the set of flight control parameters includes a command link parameter, the method comprising:
   activating a minor alarm condition with respect to a command link failure in case the command link is interrupted during a first time interval, and in such case,
   initiating a horizontal flight of the vehicle.

3. The method according to claim 2, wherein the method comprises:
   activating a major alarm condition with respect to a command link failure in case the command link is interrupted during a second time interval exceeding said first time interval, and in such case, the emergency route involves flying the vehicle towards a base location on the ground.

4. The method according to claim 3, wherein the vehicle is flown towards the base location involving elevating the vehicle to a predetermined altitude.

5. The method according to claim 3, further comprising:
clearing the minor alarm condition with respect to a command link failure in case the command link returns before expiry of the second time interval, and
returning the flight control of the vehicle to the mode in which the vehicle was controlled before the interruption in the command link.

6. A method according to claim 3, wherein in case of a major alarm condition with respect to a command link failure, the command link remains interrupted during a third time interval exceeding said second time interval, the emergency route involves flying the vehicle to an air space above a termination waypoint on the ground at which it is estimated that the vehicle's flight may be ended without injuring any personnel or causing uncontrolled material damages.

7. The method according to claim 6, wherein in case of a major alarm condition with respect to a command link failure, the command link remains interrupted during a fourth time interval exceeding said third time interval, initiating an emergency landing of the vehicle at the termination waypoint.

8. The method according to claim 2, wherein in case the command link returns at any instance in time, a link status message is transmitted from the vehicle to the control station, the link status message indicating a functioning condition for the command link.

9. The method according to claim 8, wherein after transmission of the link status message, the method further comprises:
enabling the vehicle to receive overriding commands from the control station via the command link,
discontinuing a flight according to the emergency route in case overriding commands are received, and in such case
enabling a flight control according to the manual mode.

10. The method according to claim 1, wherein the autonomous flight control mode includes transmission of the control commands to the vehicle in the form of a number of commands constituting an alternative set of waypoints.

11. The method according to claim 1, wherein the manual flight control mode includes transmission of the control commands to the vehicle in the form of real-time commands.

12. The method according to claim 1, further comprising:
selecting points from the first set of predefined waypoints from an indexed table by means of a stepwise procedure, and
selecting points from the second set of predefined waypoints by means of jumping from a first line in the indexed table to a second line in the indexed table, the second line being specified on said first line.

13. A computer program directly loadable into the internal memory of a digital computer, comprising software for accomplishing the steps of claim 1 when said program is run on a computer.

14. A computer readable medium, having a program recorded thereon, where the program is to make a computer accomplish the steps of claim 1.

15. An unmanned aerial vehicle controllable from a control station by means of a wireless command link comprising
an on-board flight control system including:
an autonomous control sub-system adapted to control the vehicle to fly according to a primary route defined by a first set of predefined waypoints, and
a manual control sub-system adapted to receive commands from the control station via the wireless command link, and control the vehicle to fly according to a primary route defined by the commands from the control station, and
a functional monitoring system adapted to monitor a set of flight control parameters, and in case at least one of the flight control parameters falls outside an acceptable range, set a major alarm condition and initiate a flight of the vehicle according to an emergency route defined by a second set of predefined waypoints, wherein the set of flight control parameters includes at least one engine parameter, and the functional monitoring system is adapted to, in case at least one of the at least one engine parameter decreases below a threshold value, set an alarm condition with respect to an engine failure, and fly the vehicle according to the emergency route to an air space above a termination waypoint on the ground at which it is estimated that the vehicle's flight may be ended without injuring any personnel or causing uncontrolled material damages.

16. The unmanned aerial vehicle according to claim 15, wherein the functional monitoring system is adapted to monitor the wireless command link, and in case the command link is interrupted during a first time interval: activate an alarm condition with respect to a minor command link failure, and
initiate a horizontal flight of the vehicle.

17. The unmanned aerial vehicle according to claim 16, wherein the functional monitoring system is adapted to, in case the command link is interrupted during a second time interval exceeding said first time interval: activate a major alarm condition with respect to a command link failure, and
fly the vehicle towards a base location on the ground.

18. The unmanned aerial vehicle according to claim 17, wherein the functional monitoring system is adapted to, in case the command link returns before expiry of the second time interval:
clear the alarm condition with respect to the minor command link failure, and
return the flight control of the vehicle to the control sub-system which controlled the vehicle before the interruption in the command link.

19. The unmanned aerial vehicle according to claim 17, wherein the functional monitoring system is adapted to, in case of a major alarm condition with respect to a command link failure, the command link remains interrupted during a third time interval exceeding said second time interval, fly the vehicle to an air space above a termination waypoint on the ground at which it is estimated that the vehicle's flight may be ended without injuring any personnel or causing uncontrolled material damages.

20. The unmanned aerial vehicle according to claim 17, wherein the functional monitoring system is adapted to initiate a landing of the vehicle at the termination waypoint, if at the expiry of a fourth time interval after that the command link failure occurred, the command link failure remains; the fourth time interval exceeding said third time interval.

21. The unmanned aerial vehicle according to claim 16, wherein the functional monitoring system is adapted to, in case the command link returns at any instance in time, generate a link status message indicating a functioning condition for the command link.

22. The unmanned aerial vehicle according to claim 21, wherein the functional monitoring system is adapted to, after that the link status message has been transmitted to the control station:
  enable the vehicle to receive overriding commands from the control station via the command link,
  discontinue a flight according to the emergency route in case overriding commands are received, and in such case
  enable activation of the manual control sub-system.

* * * * *